US009584396B2

(12) United States Patent
Zheng et al.

(10) Patent No.: US 9,584,396 B2
(45) Date of Patent: Feb. 28, 2017

(54) LABEL-BASED MEASUREMENT METHOD, APPARATUS, AND SYSTEM

(71) Applicant: HUAWEI TECHNOLOGIES CO., LTD., Shenzhen (CN)

(72) Inventors: Lianshu Zheng, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 14/055,164

(22) Filed: Oct. 16, 2013

(65) Prior Publication Data

US 2014/0036689 A1     Feb. 6, 2014

Related U.S. Application Data

(63) Continuation of application No. PCT/CN2011/073241, filed on Apr. 25, 2011.

(51) Int. Cl.
*H04L 12/723*     (2013.01)
*H04L 12/26*     (2006.01)

(52) U.S. Cl.
CPC .......... *H04L 43/50* (2013.01); *H04L 43/0823* (2013.01); *H04L 43/0852* (2013.01); *H04L 43/0888* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 7,076,559 B1 * | 7/2006 | Ghanwani et al. | 709/230 |
| 2005/0220030 A1 | 10/2005 | Nagami et al. | 370/241 |
| 2007/0195709 A1 * | 8/2007 | He | H04L 12/5695 370/392 |

(Continued)

FOREIGN PATENT DOCUMENTS

| | | |
|---|---|---|
| CN | 1881908 | 12/2006 |
| CN | 101056215 | 10/2007 |

(Continued)

OTHER PUBLICATIONS

Chinese Office Action dated Dec. 3, 2014 in corresponding Chinese Patent Application No. 201180000223.2.

(Continued)

*Primary Examiner* — Kevin C Harper
*Assistant Examiner* — Derrick V Rose
(74) *Attorney, Agent, or Firm* — Staas & Halsey LLP

(57) ABSTRACT

Embodiments of the present invention provide a label-based measurement method, apparatus, and system. The method includes: allocating at least two labels to the same FEC; obtaining a label insertion mode for the at least two labels; receiving data packet, where one of the at least two labels is inserted in the data packet; and performing, according to the label insertion mode and the data packet, performance measurement on a network that the FEC passes through. By using the technical solutions provided in the embodiments of the present invention, a problem of network bandwidth occupation caused by inserting a test packet and an OAM packet during performance measurement and a problem of measurement result inaccuracy caused by OAM packet loss may be solved.

4 Claims, 1 Drawing Sheet

(56) References Cited

U.S. PATENT DOCUMENTS

2007/0242620 A1   10/2007  Zhai et al.
2008/0031146 A1*  2/2008  Kwak et al. .................. 370/250
2011/0188380 A1   8/2011  Song et al.

FOREIGN PATENT DOCUMENTS

| CN | 101197759 | 6/2008 |
|---|---|---|
| CN | 101605020 | 12/2009 |
| CN | 101729197 | 6/2010 |

OTHER PUBLICATIONS

Chinese Search Report dated Nov. 25, 2014 in corresponding Chinese Patent Application No. 2011800002232.
Frost et al., "Packet Loss and Delay Measurement for MPLS Networks", Cisco Systems, Dec. 8, 2010, pp. 1-39.
European Extended Search Report issued Jan. 2, 2014 in corresponding European Patent Application No. 11864328.7.
Bryant, Stewart and Dan Frost. *Packet Loss and Delay Measurement Profile for MPLS-based Transport Networks.* Internet-Draft Memo: Internet Engineering Task Force, Feb. 4, 2011.
Bryant, Stewart and Dan Frost. *Packet Loss and Delay Measurement for MPLS Networks.* Internet-Draft Memo: Internet Engineering Task Force, Apr. 20, 2011.
Dong, Jie, Zhenbin Li, and Bhavani Parise. *A Framework for L3VPN Performance Monitoring.* Internet-Draft Memo: Internet Engineering Task Force, Apr. 17, 2013.
International Search Report mailed Feb. 19, 2012, in corresponding International Application PCT/CN2011/073241.
*OAM functions and mechanisms for Ethernet based networks, Amendment 1: Addition of new OAM "ETH-CSF", interoperability between ETH-LT (2006) and ETH-LT (2008),* ITU-T Y.1731, Jul. 2010, pp. 1-12.
Frost, D. et al., *Packet Loss and Delay Measurement for the MPLS Transport Profile,* MPLS, Cisco Systems, Jul. 26, 2010, pp. 1-30.
International Search Report and Written Opinion, dated Sep. 2, 2012, in corresponding International Application No. PCT/CN2011/073241 (10 pp.).

* cited by examiner

LABEL-BASED MEASUREMENT METHOD, APPARATUS, AND SYSTEM

CROSS-REFERENCE TO RELATED APPLICATIONS

This application is a continuation of International Application No. PCT/CN2011/073241, filed on Apr. 25, 2011, which is hereby incorporated by reference in its entirety.

TECHNICAL FIELD

Embodiments of the present invention relate to the field of network communications, and in particular, to a label-based measurement method, apparatus, and system.

BACKGROUND

A lot of MPLS (Multi-Protocol Label Switching)-based applications, for example, an L3VPN (Layer 3 Virtual Private Network) and the like have already been deployed on a large scale on actual networks, but an MPLS OAM (Operation, Administration and Maintenance) function is relatively weak. Currently, measurement technologies with respect to metrics reflecting network performance such as packet loss and delay on an MPLS network need further research.

An FEC (Forwarding Equivalence Class) represents a group of data packets with similar or identical forwarding characteristics on the MPLS network. Data packets belonging to the same FEC are assigned a determined MPLS label on different network nodes. A label (Label) is a fixed-length identifier, and is generally located between a data link layer encapsulation header and a layer 3 data packet. The FEC is bound to the label, and data packets are forwarded according to the label. Data packets belonging to the same FEC pass through the same LSP (Label Switched Path). On the MPLS network, an LSR (Label Switching Router) forms an MPLS network node, and provides functions of label switching and label distribution.

SUMMARY

Embodiments of the present invention provide a label-based measurement method, apparatus, and system to solve the problem of network bandwidth occupation caused by inserting a test packet and an OAM packet during performance measurement and the problem of measurement result inaccuracy caused by OAM packet loss in the prior art.

To solve the technical problems, an embodiment of the present invention provides a label-based measurement method, including:

allocating at least two labels to a same forwarding equivalence class FEC;

obtaining a label insertion mode for the at least two labels;

receiving a data packet, where one of the at least two labels is inserted in the data packet; and performing, according to the label insertion mode and the data packet, performance measurement on a network that the FEC passes through.

An embodiment of the present invention provides a label-based measurement apparatus, including:

a label allocating module, configured to allocate at least two labels to the same forwarding equivalence class FEC;

an obtaining module, configured to obtain a label insertion mode for the at least two labels;

a receiver, configured to receive a data packet, where one of the at least two labels is inserted in the data packet; and a measuring module, configured to perform, according to the label insertion mode and the data packet, performance measurement on a network that the FEC passes through.

An embodiment of the present invention provides a label-based measurement system, including a first network device and a second network device, where:

the first network device is configured to receive at least two labels allocated by the second network device to the same forwarding equivalence class FEC, insert one of the at least two labels into data packet according to a label insertion mode, and send the data packet that one of the at least two labels is inserted into; and the second network device is configured to allocate the at least two labels, obtain the label insertion mode, receive the data packet, and perform, according to the label insertion mode and the data packet, performance measurement on a network that the FEC passes through.

By using the technical solutions provided in the embodiments of the present invention, MPLS network performance may be measured without inserting a test packet and an OAM packet, and therefore no additional network bandwidth is occupied.

BRIEF DESCRIPTION OF DRAWINGS

To illustrate the technical solutions in the embodiments of the present invention more clearly, the following briefly introduces the accompanying drawings needed for describing the embodiments. Apparently, the accompanying drawings in the following description show merely some embodiments of the present invention, and those skilled in the art in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by those skilled in the art in the art based on the embodiments of the present invention without creative efforts shall fall within the protection scope of the present invention.

An embodiment of the present invention provides a label-based measurement method, including: allocating at least two labels to a same FEC; obtaining a label insertion mode for the at least two labels; receiving a data packet, where one of the at least two labels is inserted in the data packet; and performing, according to the label insertion mode and the data packet, performance measurement on a network that the FEC passes through. By using the technical solution provided in the embodiment of the present invention, a problem of network bandwidth occupation caused by inserting a test packet and an OAM packet during performance measurement and the problem of measurement result inaccuracy caused by OAM packet loss may be solved.

For better understanding of the above aspects, features, and advantages of the present invention, embodiments of the present invention are hereinafter described in detail with reference to the accompanying drawings and exemplary embodiments.

Embodiment 1

Figure 1:
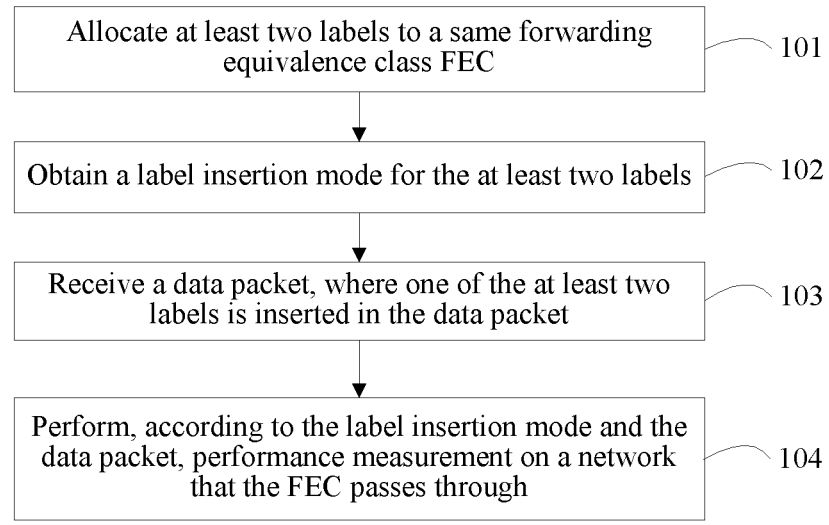
FIG. 1 is a flowchart of a label-based measurement method according to an embodiment of the present invention.

FIG. 1 is a flowchart of a label-based measurement method according to the embodiment of the present invention. The label-based measurement method includes the following:

101. Allocate at least two labels to a same FEC.

A receiver allocates at least two labels to the same FEC, and notifies a sender of the at least two labels corresponding to the FEC. The FEC may be a group of data packets with identical or similar forwarding characteristics between two MPLS network devices.

102. Obtain a label insertion mode for the at least two labels.

The receiver obtains, from the sender, a label insertion mode for the at least two labels. The label insertion mode includes:

inserting the at least two labels into data packets alternately according to a quantity law. For example, the first label and the second label are inserted into the data packets alternately according to a quantity law. For example, the first label and the second label are inserted into every 50 data packets alternately, that is, the first label is inserted into a $1^{st}$ data packet to a $50^{th}$ data packet, the second label is inserted into a $51^{st}$ data packet to a $100^{th}$ data packet, the first label is inserted into a $101^{st}$ data packet to a $150^{th}$ data packet, the second label is inserted into subsequent 50 data packets, and the rest may be deduced in the same way. Or, the first label is inserted into a $1^{st}$ data packet to a $50^{th}$ data packet, the second label is inserted into a $51^{st}$ data packet to an $90^{th}$ data packet, the first label is inserted into subsequent 50 data packets, the second label is inserted into subsequent 40 data packets, and the rest may be deduced in the same way. Alternatively, multiple labels such as a first label, a second label, and a third label may be inserted into a data packet alternately according to a quantity law. For example, the first label, the second label, and the third label are inserted into every 50 data packets alternately, that is, the first label is inserted into a $1^{st}$ data packet to a $50^{th}$ data packet, the second label is inserted into a $51^{st}$ data packet to a $100^{th}$ data packet, the third label is inserted into a $101^{st}$ to a $150^{th}$ data packet, the first label is inserted into subsequent 50 data packets again, and the rest may be deduced in the same way.

Or, the at least two labels may be inserted into data packets alternately according to a time law. For example, the first label and the second label are inserted into data packets alternately according to a time law. For example, the first label is inserted into the data packets initially, the second label is inserted into the data packets after a time interval, the first packet is inserted into the data packets again after another time interval, and the rest may be deduced in the same way; or the first label is inserted into the data packets initially, the second label is inserted into the data packets after a first time interval, the first label is inserted into the data packets again after a second time interval, the second label is inserted into the data packets again after the first time interval, and the rest may be deduced in the same way. Alternatively, multiple labels such as a first label, a second label, and a third label may be inserted into the data packets alternately according to a time law.

When the sender sends data packets according to a time law, the inserting the at least two labels into the data packets alternately according to the quantity law may be mutually associated with the inserting the at least two labels into the data packets alternately according to the time law. The time law according to which the sender sends data packets may be a default time law that the sender and the receiver agree on earlier, or the time law is obtained by the receiver from the sender, or the time law is known by the receiver through a third party, for example, a network management system. For example, if an obtained label insertion mode is inserting the first label and the second label into every 50 data packets alternately according to a quantity law and the sender sends one data packet every 0.2 ms according to a time law, it may also be considered that the first label and the second label are inserted into the data packets alternately according to a time law, that is, the first label and the second label are inserted into the data packets alternately every 10 ms. If the obtained label insertion mode is inserting the first label and the second label into data packets alternately every 20 ms according to a time law and the sender sends one data packet every 0.2 ms according to the time law, it may also be considered that the first label and the second label are inserted into the data packets alternately according to a quantity law, that is, the first label and the second label are inserted into every 100 data packets alternately.

103. Receive a data packet, where one of the at least two labels is inserted in the data packet.

Before sending a data packet, the sender inserts one of the at least two labels into an MPLS packet header according to the label insertion mode, and the receiver receives the data packet.

104. Perform, according to the label insertion mode and the data packet, performance measurement on a network that the FEC passes through.

The performance measurement includes but is not limited to such network performance metrics as a packet loss ratio, a transmission delay, throughput, and delay variation.

When the label insertion mode is inserting the at least two labels into the data packets alternately according to a quantity law, a quantity law of the data packets is measured according to the inserted labels, and performance measurement is performed, according to the label insertion mode and the measured quantity law of the data packets, on the network that the FEC passes through, for example, a packet loss ratio is calculated.

For example, if the label insertion mode is inserting the first label and the second label into every 50 data packets alternately, the received data packets are as follows: 50 data packets with the first label inserted, 48 data packets with the second label inserted, 45 data packets with the first label inserted, 47 data packets with the second label inserted, 47 data packets with the first label inserted, and 49 data packets with the first label inserted. Then, the pa cket loss ratio is calculated as follows: $(6\times50-(50+48+45+47+47+49))/(6\times50)=4.667\%$.

When the label insertion mode is inserting the at least two labels into the data packets alternately according to a time law, the time law of the data packets is measured. For example, when labels inserted into the received data packets are alternate between two labels of the at least two labels, a time stamp is extracted or system time of the apparatus is collected to measure the time law of the data packets, and then performance measurement is performed, according to the label insertion mode and the measured time law of the data packets, on the network that the FEC passes through, for example, a transmission delay is measured.

For example, if the label insertion mode is inserting the first label and the second label into data packets alternately every 10 ms, the data packets are received as follows: when a first data packet with the first label inserted is received, a time stamp T1 is extracted; next, multiple data packets with the first label inserted are received successively, and when data packets with the second label inserted are received, a time stamp T1+11 ms is extracted; next, multiple data packets with the second label inserted are received successively, and when data packets with the first label inserted are received again, a time stamp T1+20.5 ms is extracted; next, multiple data packets inserted with the first packet are received successively, and when data packets with the second label inserted are received again, a time stamp T1+32 ms is extracted; next, multiple data packets with the second label inserted are received successively, and when data packets with the first label inserted are received again, a time stamp T1+43 ms is extracted. Then, a total transmission delay is calculated as follows: (T1+43)−(T1+4×10)=3 ms, and an average transmission delay is calculated as follows: ((T1+43)−(T1+4×10))/4=0.75 ms.

Specifically, the calculation of performance metrics may be performed locally, or collected data may be sent to the sender for processing, or collected data and the label insertion mode may be sent to a network management device for processing.

The at least two labels may be external layer labels, and participate in public network label forwarding. On a public network, a network device queries a label forwarding table according to the external layer labels. In a label forwarding table of any one network device on the public network, each of labels corresponding to the same FEC corresponds to the same forwarding action and the same next hop.

The at least two labels may also be internal layer labels, and do not participate in public network label forwarding. Data packets are forwarded on the public network according to the external layer labels. On the public network, the network devices transmit the internal layer labels as a data part. In a VPN scenario, when a data packet reaches an edge network device on the public network, for example, a PE (Provider Edge) device, external layer labels pop up, and the label forwarding table is queried according to the internal layer labels. Each of the at least two labels corresponds to the same forwarding action, that is, a data packet is forwarded to the same next hop, for example, a CE (Customer Edge) device. In a non-VPN MPLS network scenario, when a data packet reaches an MPLS network device of a last hop, the external layer labels pop up firstly, and then the internal layer labels pop up. The at least two labels used as the internal layer labels are only used to measure network performance.

By using the technical solution provided in the embodiment of the present invention, MPLS network performance is measured by inserting at least two labels into a data packet alternately. This may solve the problem of network bandwidth occupation caused by inserting a test packet and an OAM packet during performance measurement and the problem of measurement result inaccuracy caused by OAM packet loss.

Embodiment 2

Figure 2:
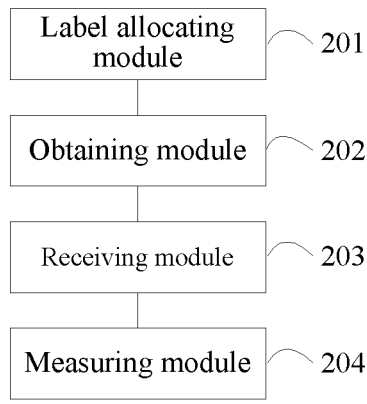
FIG. 2 is a block diagram of a label-based measurement apparatus according to an embodiment of the present invention.

FIG. 2 is a block diagram of a label-based measurement apparatus according to the embodiment of the present invention. The apparatus includes a label allocating module 201, an obtaining module 202, a receiving module 203, and a measuring module 204.

The label allocating module 201 is configured to allocate at least two labels to the same FEC.

The FEC may be a group of data packets with identical or similar forwarding characteristics between two MPLS network devices.

The obtaining module 202 is configured to obtain a label insertion mode for the at least two labels.

The obtaining module 202 is configured to obtain, from a sender, a label insertion mode for the at least two labels. The label insertion mode includes:

inserting the at least two labels into data packets alternately according to a quantity law. For example, a first label and a second label are inserted into the data packets alternately according to a quantity law. For example, the first label and the second label are inserted into every 50 data packets alternately, that is, the first label is inserted into a $1^{st}$ data packet to a $50^{th}$ data packet, the second label is inserted into a $51^{st}$ data packet to a $100^{th}$ data packet, the first label is inserted into a $101^{st}$ data packet to a $150^{th}$ data packet, the second label is inserted into subsequent 50 data packets, and the rest may be deduced in the same way. Or, the first label is inserted into a $1^{st}$ data packet to a $50^{th}$ data packet, the second label is inserted into a $51^{st}$ data packet to an $90^{th}$ data packet, the first label is inserted into subsequent 50 data packets, the second label is inserted into subsequent 40 data packets, and the rest may be deduced in the same way. Alternatively, multiple labels such as a first label, a second label, and a third label may be inserted into data packets alternately according to a quantity law. For example, the first label, the second label, and the third label are inserted into every 50 data packets alternately, that is, the first label is inserted into a $1^{st}$ data packet to a $50^{th}$ data packet, the second label is inserted into a $51^{st}$ data packet to a $100^{th}$ data packet, the third label is inserted into a $101^{st}$ data packet to a $150^{th}$ data packet, the first label is inserted into subsequent 50 data packets again, and the rest may be deduced in the same way.

Or, the at least two labels may be inserted into data packets alternately according to a time law. For example, a first label and a second label are inserted into the data packets alternately according to the time law. For example, the first label is inserted into the data packets initially, the second label is inserted into the data packets after a time interval, the first packet is inserted into the data packets again after another time interval, and the rest may be deduced in the same way; or the first label is inserted into the data packets initially, the second label is inserted into the data packets after a first time interval, the first label is inserted into the data packets again after a second time interval, the second label is inserted into the data packets again after the first time interval, and the rest may be deduced in the same way. Alternatively, multiple labels such as a first label, a second label, and a third label may be inserted into the data packets alternately according to a time law.

When the sender sends data packets according to a time law, the inserting the at least two labels into the data packets alternately according to the quantity law may be mutually associated with the inserting the at least two labels into the data packets alternately according to the time law. The time law according to which the sender sends data packets may be a default time law agreed earlier by the sender and the receiver, or the time law is obtained by the receiver from the sender, or the time law is known by the receiver through a third party, for example, a network management system. For example, if the obtained label insertion mode is inserting the first label and the second label into every 50 data packets alternately according to a quantity law and the sender sends one data packet every 0.2 ms according to a time law, it may also be considered that the first label and the second label are inserted into the data packets alternately according to a time law, that is, the first label and the second label are inserted into the data packets alternately every 10 ms. If the obtained label insertion mode is inserting the first label and the second label into data packets alternately every 20 ms according to a time law and the sender sends one data packet every 0.2 ms according to the time law, it may also be considered that the first label and the second label are inserted into the data packets alternately according to a quantity law, that is, the first label and the second label are inserted into every 100 data packets alternately.

The receiving module 203 is configured to receive a data packet, where one of the at least two labels is inserted in the data packet.

Before sending a data packet, the sender inserts one of the at least two labels into an MPLS packet header according to the label insertion mode, and the receiving module 203 receives the data packet.

The measuring module 204 is configured to perform, according to the label insertion mode and the data packet, performance measurement on a network that the FEC passes through.

The performance measurement includes but is not limited to such network performance metrics as a packet loss ratio, a transmission delay, throughput, and delay variation.

When the label insertion mode is inserting the at least two labels into data packets alternately according to a quantity law, the measuring module 204 measures a quantity law of the data packets according to the inserted labels, and performs, according to the label insertion mode and the measured quantity law of the data packets, performance measurement on the network that the FEC passes through, for example, a packet loss ratio is calculated.

When the label insertion mode is inserting the at least two labels into the data packets alternately according to a time law, the measuring module 204 measures a time law of the data packets. For example, when labels inserted into the received data packets are alternate between two labels of the at least two labels, the measuring module 204 extracts a time stamp or collects system time of the apparatus to measure a time law of the data packets, and then performs, according to the label insertion mode and the measured time law of the data packets, performance measurement on the network that the FEC passes through, for example, a transmission delay.

Specifically, the calculation of performance metrics may be performed locally, or collected data may be sent to the sender for processing, or collected data and the label insertion mode may be sent to a network management device for processing.

The at least two labels may be external layer labels, and participate in public network label forwarding. On a public network, a network device queries a label forwarding table according to the external layer labels. In a label forwarding table of any one network device on the public network, each of labels corresponding to the same FEC corresponds to the same forwarding action and the same next hop.

The at least two labels may also be internal layer labels, and do not participate in public network label forwarding. Data packets are forwarded on the public network according to the external layer labels. On the public network, the network devices transmit the internal layer labels as a data part. In a VPN scenario, when a data packet reaches an edge network device on the public network, for example, a PE (Provider Edge, provider edge) device, external layer labels pop up, and the label forwarding table is queried according to the internal layer labels. Each of the at least two labels corresponds to the same forwarding action, that is, data packets are forwarded to the same next hop, for example, a CE (Customer Edge, a customer edge) device. In a non-VPN MPLS network scenario, when a data packet reaches an MPLS network device of a last hop, the external layer labels pop up firstly, and then the internal layer labels pop up. The at least two labels used as the internal layer labels are only used to measure network performance.

The label-based measurement apparatus may be implemented by a processor or a hardware device.

Embodiment 3

Figure 3:
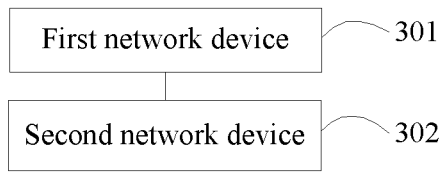
FIG. 3 is a block diagram of a label-based measurement system according to an embodiment of the present invention.

FIG. 3 is a block diagram of a label-based measurement system according to a third embodiment of the present invention. The system includes a first network device 301 and a second network device 302, where:

the first network device 301 is configured to receive at least two labels allocated by the second network device 302 to the same FEC, insert one of the at least two labels into a data packet according to a label insertion mode, and send the data packet with one of the at least two labels inserted; and the second network device 302 is configured to allocate the at least two labels, obtain the label insertion mode, receive the data packet, and perform, according to the label insertion mode and the data packet, performance measurement on a network that the FEC passes through.

The second network device 302 allocates at least two labels to the same FEC, and notifies the first network device 301 of the at least two labels corresponding to the FEC. The FEC may be a group of data packets with identical or similar forwarding characteristics between two MPLS network devices.

The second network device 302 obtains, from the first network device 301, a label insertion mode for the at least two labels. The label insertion mode includes:

inserting the at least two labels into the data packets alternately according to a quantity law. For example, a first label and a second label are inserted into the data packets alternately according to a quantity law, or multiple labels such as a first label, a second label, and a third label are inserted into the data packets alternately according to a quantity law.

Or, the at least two labels may be inserted into data packets alternately according to a time law. For example, a first label and a second label are inserted into the data packets alternately according to a time law, or multiple labels such as a first label, a second label, and a third label are inserted into the data packets alternately according to a time law.

When the first network device 301 sends data packets according to a time law, the inserting the at least two labels into the data packets alternately according to the quantity law may be mutually associated with the inserting the at least two labels into the data packets alternately according to the time law. The time law according to which the first network device 301 sends data packets may be a default time law which the first network device 301 and the second network device 302 agree on earlier, or the time law is obtained by the second network device 302 from the first network device 301, or the time law is known by the second network device 302 through a third party, for example, a network management system.

Before sending a data packet, the first network device 301 inserts one of the at least two labels into an MPLS packet header according to the label insertion mode, and the second network device 302 receives the data packet.

The performance measurement includes but is not limited to such network performance metrics as a packet loss ratio, a transmission delay, throughput, and delay variation.

When the label insertion mode is inserting the at least two labels into the data packets alternately according to a quantity law, the second network device 302 measures a quantity law of the data packets according to the inserted labels, and performs, according to the label insertion mode and the measured quantity law of the data packets, performance measurement on the network that the FEC passes through, for example, a packet loss ratio is calculated.

When the label insertion mode is inserting the at least two labels into the data packets alternately according to a time law, the second network device 302 measures a time law of the data packets. For example, when labels inserted into the received data packets are alternate between two labels of the at least two labels, the second network device 302 extracts a time stamp or collects system time of the apparatus to measure a time law of the data packets, and then performs, according to the label insertion mode and the measured time law of the data packets, performance measurement on the network that the FEC passes through, for example, a transmission delay.

Specifically, the calculation of performance metrics may be performed by the second network device 302, or collected data may be sent to the first network device 301 for processing, or collected data and the label insertion mode may be sent to a network management device for processing.

The at least two labels may be external layer labels, and participate in public network label forwarding. On a public network, a network device queries a label forwarding table according to the external layer labels. In a label forwarding table of any one network device on the public network, each of labels corresponding to the same FEC corresponds to the same forwarding action and the same next hop.

The at least two labels may also be internal layer labels, and do not participate in public network label forwarding. Data packets are forwarded on the public network according to the external layer labels. On the public network, the network devices transmit the internal layer labels as a data part.

By using the technical solution provided in the embodiment of the present invention, the problem of network bandwidth occupation caused by inserting a test packet and an OAM packet during performance measurement and the problem of measurement result inaccuracy caused by OAM packet loss may be solved.

It may be understandable to people of ordinary skill in the art that all or a part of the steps in the methods provided in the preceding embodiments may be performed by hardware instructed by a program. The program may be stored in a computer readable storage medium, where the storage medium may be a ROM/RAM, a magnetic disk, or an optical disk, and the like.

The above descriptions are merely exemplary embodiments of the present invention, but the protection scope of the present invention is not limited thereto. Any modification or replacement that may be easily thought of by those skilled in the art without departing from the technical scope of the present invention shall fall within the protection scope of the present invention.

What is claimed is:

1. A label-based measurement method, comprising:
    allocating, by a receiver, at least two labels to a same forwarding equivalence class (FEC);
    notifying, by the receiver, the at least two labels to a sender;
    obtaining, by the receiver, a label insertion mode for the at least two labels from the sender;
    receiving, by the receiver, data packets sent from the sender, wherein the at least two labels are inserted in the data packets according to the label insertion mode; and
    performing, by the receiver, according to the label insertion mode and the data packets, performance measurement on a network connection between the sender and the receiver,
    wherein the label insertion mode comprises:
        inserting the at least two labels into the data packets alternately according to a quantity law, or
        inserting the at least two labels into the data packets alternately according to a time law,
        when the label insertion mode is inserting the at least two labels into the data packets alternately according to a quantity law, count the quantity law of the data packets, and perform, according to the label insertion mode and the counted quantity law of the data packets, performance measurement on the network that the FEC passes through; and
        when the label insertion mode is inserting the at least two labels into the data packets alternately according to a time law, count the time law of the data packets, and perform, according to the label insertion mode and the counted time law of the data packets, performance measurement on the network connection between the sender and the receiver.

2. A label-based measurement apparatus, comprising:
    a non-transitory computer readable storage medium to store program(s), and
    computer hardware configured to implement, including configured by the program(s) to implement:
    a label allocating module, configured to allocate at least two labels to a same forwarding equivalence class (FEC), and notify the at least two labels to a sender;
    an obtaining module, configured to obtain a label insertion mode for the at least two labels from the sender;
    a receiver module, configured to receive data packets sent from the sender, wherein the at least two labels are inserted in the data packets according to the label insertion mode; and
    a measuring module, configured to perform, according to the label insertion mode and the data packets, performance measurement on a network connection between the sender and the receiver,
    wherein the label insertion mode comprises:
        inserting the at least two labels into the data packets alternately according to a quantity law, or
        inserting the at least two labels into the data packets alternately according to a time law,
    wherein the measuring module is configured to:
        when the label insertion mode is inserting the at least two labels into the data packets alternately according to a quantity law, count the quantity law of the data packets, and perform, according to the label insertion mode and the counted quantity law of the data packets, performance measurement on the network that the FEC passes through; and when the label insertion mode is inserting the at least two labels into the data packets alternately according to a time law, count the time law of the data packets, and perform, according to the label insertion mode and the counted time law of the data packets, performance measurement on the network connection between the sender and the receiver.

3. A label-based measurement system, comprising:
a first network device; and
a second network device,
wherein the second network device is to allocate at least two labels to a forwarding equivalence class (FEC), obtain a label insertion mode, and send the at least two labels to the first network;
wherein upon receiving the at least two labels, the first network device is to insert the at least two labels into data packets according to the label insertion mode, and send the data packets to the second network device; and
wherein upon receiving the data packets, the second network device is to perform, according to the label insertion mode and the data packets, performance measurement on a network connection between the sender and the receiver,
wherein the label insertion mode comprises:
 inserting the at least two labels into the data packets alternately according to a quantity law, or
 inserting the at least two labels into the data packets alternately according to a time law,
wherein the performance measurement comprises:
 when the label insertion mode is inserting the at least two labels into the data packets alternately according to a quantity law, count the quantity law of the data packets, and perform, according to the label insertion mode and the counted quantity law of the data packets, performance measurement on the network that the FEC passes through; and
 when the label insertion mode is inserting the at least two labels into the data packets alternately according to a time law, count the time law of the data packets, and perform, according to the label insertion mode and the counted time law of the data packets, performance measurement on the network connection between the sender and the receiver.

4. A label-based measurement apparatus, comprising:
a non-transitory computer readable storage medium to store program(s), and
computer hardware configured to implement, including configured by the program(s) to implement:
 a label allocating module, configured to allocate at least two labels to a same forwarding equivalence class (FEC), and notify the at least two labels to a sender;
 an obtaining module, configured to obtain a label insertion mode for the at least two labels from the sender;
 a receiver module, configured to receive data packets sent from the sender, wherein the at least two labels are inserted in the data packets according to the label insertion mode; and
a measuring module, configured to perform, according to the label insertion mode and the data packets, performance measurement on a network connection between the sender and the receiver,
wherein the label insertion mode comprises:
 inserting the at least two labels into the data packets alternately according to a quantity rule, or
 inserting the at least two labels into the data packets alternately according to a time rule,
wherein the measuring module is configured to:
 when the label insertion mode is inserting the at least two labels into the data packets alternately according to a quantity rule, count the quantity rule of the data packets, and perform, according to the label insertion mode and the counted quantity rule of the data packets, performance measurement on the network connection between the sender and the receiver; and
 when the label insertion mode is inserting the at least two labels into the data packets alternately according to a time rule, count the time rule of the data packets, and perform, according to the label insertion mode and the counted time rule of the data packets, performance measurement on the network connection between the sender and the receiver.

* * * * *